United States Patent [19]

Harper

[11] Patent Number: 5,962,586

[45] Date of Patent: Oct. 5, 1999

[54] EPOXY RESIN(S) WITH ANHYDRIDE AND POLYBUTADIENE-MALEIC ANHYDRIDE ADDUCT

[76] Inventor: John D. Harper, 5146 Dorado Dr., Unit 202, Huntington Beach, Calif. 92649

[21] Appl. No.: 08/312,827

[22] Filed: Sep. 27, 1994

[51] Int. Cl.[6] .............................. C08L 51/04; C08L 63/00
[52] U.S. Cl. ................................................ 525/65; 525/117
[58] Field of Search ........................................ 525/65, 117

[56] References Cited

U.S. PATENT DOCUMENTS

| | | | |
|---|---|---|---|
| 4,028,432 | 6/1977 | Dawans et al. | 528/112 |
| 4,601,944 | 7/1986 | Zussman | 528/297 |
| 4,900,848 | 2/1990 | Saito et al. | 528/96 |
| 5,091,498 | 2/1992 | Arduengo, III et al. | 525/112 |
| 5,324,767 | 6/1994 | Koyama et al. | 523/444 |

FOREIGN PATENT DOCUMENTS

| | | |
|---|---|---|
| 56-59838 | 5/1981 | Japan . |
| 56-74117 | 6/1981 | Japan . |
| 62-4756 | 1/1987 | Japan . |

*Primary Examiner*—Robert E. Sellers
*Attorney, Agent, or Firm*—Thomas A. Schenach

[57] ABSTRACT

Improved toughened epoxy resin systems having glass transition temperatures of 250° C. to 350° C. are prepared by carefully curing a blend of epoxy resin or resins, all of which have an epoxy functionality of at least 2 with the mixture having an epoxy functionality greater than 2, an anhydride hardener mixture comprising a bicycloalkenedicarboxylic acid anhydride, a polybutadiene-maleic anhydride adduct, and optionally, a polybutadiene, a bismaleimide, or benzophenone tetracarboxylic acid dianhydride, preferably using a dialkyl imidazole-2-thione accelerator.

5 Claims, No Drawings

EPOXY RESIN(S) WITH ANHYDRIDE AND POLYBUTADIENE-MALEIC ANHYDRIDE ADDUCT

SPECIFICATION

This invention relates to epoxy resins. More particularly, it relates to improved epoxy resin systems having outstanding high temperature properties and increased toughness relative to ordinary epoxy resin systems while retaining the easy processibility which has always been an advantage in epoxy systems.

BACKGROUND OF THE INVENTION

Because of their chemical resistance, physical properties, ease of processing, and ability to adhere well to a wide variety of substrates, fillers, and reinforcing agents, epoxy resins have been used for over forty years for such applications as composites, adhesives and sealants, filament winding, potting compounds, and the like. By definition, any molecule containing the epoxy group

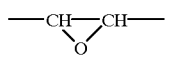

can be called an epoxy. Many commonly used epoxy resins are based on the glycidyl group

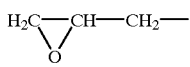

which can be introduced into a molecule containing a hydroxyl —OH or amine —NH$_2$ by reaction with epichlorohydrin; for example, the diglycidyl ether of bis(hydroxyphenyl)propane, triglycidyl p-aminophenol, tetraglycidylmethylene dianiline, and the like. Also in use are glycidyl ethers of phenol-formaldehyde condensates (novolacs). Another route to epoxy resins is the epoxidation of olefinic unsaturation in compounds such as the cyclohexenylmethyl ester of cylcohexene carboxylic acid. In the formulation of an epoxy resin system, two properties of the epoxy resin are essential—the epoxy functionality (that is, the number of epoxy groups per molecule) and the epoxy equivalent weight (the number of grams of epoxy resin which contain one chemical equivalent of epoxy group). As an example, triglycidyl p-aminophenol has an epoxy functionality of three (three epoxy groups per molecule) and an epoxy equivalent weight of 110. Functionality and equivalent weight are concepts familiar to any chemist.

Epoxy resins can be homopolymerized to polyethers by the use of Lewis acid catalysts such as boron trifluoride and Lewis base catalysts such as tertiary amines or ethyl methyl imidazole. These catalysts are conventionally referred to as epoxy curing agents or hardening agents or simply hardeners, and are used in relatively low concentrations relative to the epoxy resin. It is more common, however, to employ hardeners which actually react with the epoxy group and become a part of the final cured solid epoxy resin. The most commonly employed "co-reactant" type hardeners are the diamines and polyamines such as diethylenetriamine and methylene dianiline, and the carboxylic acid anhydrides such as phthalic anhydride, methyl tetrahydrophthalic anhydride, and methyl bicycloheptenecarboxylic acid anhydride (commonly known as "nadic methyl anhydride"). Just as one refers to the epoxy equivalent weight, one refers to an amine equivalent weight or an anhydride equivalent weight—the number of grams of hardener which contain one chemical equivalent of amine hydrogen or anhydride respectively. In theory, one epoxy equivalent weight will react completely with one hardener equivalent weight to form the final solid cured resin. This is referred to as a stoichiometry (or stoichiometric ratio) of one to one. In actual practice, the epoxy resin component will often be used in excess of the amount predicted from the epoxy and hardener equivalent weights—for example, a stoichiometry of 0.8 equivalents of hardener to 1 equivalent of epoxy resin.

It is common practice in the art to separate the components of an epoxy resin system into two parts—a "Part A" containing the epoxy resin or resins, and a "Part B" containing the hardener or hardeners. This approach has two advantages. Curing of the epoxy resin system cannot begin until the epoxy resin and the hardener are mixed—in this two-part form, the system is indefinitely stable. Moreover the amounts of epoxy resin in "A" and the amounts of hardener in "B" are chosen by the supplier to provide the desired stoichiometry once they are blended together by the customer. This latter advantage is obviously useful for those customers who are not themselves chemists, and might have difficulty calculating equivalent weights.

Once the epoxy resin and hardener are mixed, reaction will begin, leading eventually to a solid resin. The reaction however may proceed extremely slowly, especially when anhydrides are being employed as the hardeners. In order to speed up sluggish reactions, catalysts called accelerators are often added in small amounts. Tertiary amines such as benzyl dimethylamine and Lewis bases such as ethyl methyl imidazole are useful accelerators for epoxy/anhydride systems. A relatively new family of accelerators, the cyclic thioureas (also known as dialkyl imidazole-2-thiones) have proven extremely effective in accelerating epoxy/anhydride cures even at mild or ambient temperatures.

However, even with the addition of accelerators, it is customary to use heat in advancing the cure of epoxy resin systems. Often cures are carried out in stepwise fashion—the mixture is heated at a relatively low temperature at first, followed by subsequent heating at one or two higher temperatures. In order to determine the optimum cure cycle for a given epoxy resin system, a variety of laboratory techniques can be used to follow the progress of the polymerization and determine when cure is complete. Among these tests are differential scanning calorimetry (DSC), thermal mechanical analysis (TMA), dielectric analysis, and infrared analysis (IR). Once a satisfactory cure cycle has been worked out for a specific system, it is usually unnecessary to repeat the laboratory testing with each subsequent batch that is to be cured. Normally the supplier of the epoxy resin system can supply customers both with suggested ratios of epoxy resin to hardener and with suggested cure cycles which the customer can carry out without the need for extensive laboratory testing.

In addition to the epoxy resin, hardener, and accelerator, it is known in the art to include minor amounts of other ingredients in an epoxy resin system to facilitate processing or improve final properties. Among said minor ingredients are "bubble breakers" (defoamants), leveling agents, supplemental accelerators, and the like. Selection of said components for such purposes is considered within the skill of the ordinary worker.

FIELD OF THE INVENTION

Epoxy resin systems have proved to be valuable for a wide range of applications. However there are two areas in which the performance of conventional epoxies limits their usefulness in demanding applications such as the manufacture of aerospace composites. These areas are high temperature capability and toughness—hardness without brittleness. With a few exceptions, it is unusual to find an epoxy resin system with a glass transition temperature ($T_g$) above 200° C. Aerospace composites, on the other hand, are usually required to function above 200° C. and often above 300° C. well beyond the normal upper limits of epoxies. As a result, aerospace composites are usually manufactured from other resin systems such as the bismaleimides and polyimides, which have $T_g$s in the 250–350° C. range. In fact, the aerospace industry has long desired a resin system that combines high temperature capabilities like those of the polyimides with the ease of processing which is one of the outstanding advantages of epoxy resin systems. Curing of bismaleimide and polyimide resin systems requires not only heat but also high pressure plus the use of vacuum bagging or similar techniques to remove volatile byproducts of the curing which would otherwise leave voids in the final cured resin. In contrast, epoxy systems generate few if any volatile byproducts and can be cured by the application of heat alone. It is possible to achieve a $T_g$ above 200° C. in an epoxy system by choosing components which are capable of extensive crosslinking. However too high a crosslink density in an epoxy system often leads to brittleness in the final cured resin. Brittleness in an epoxy system can be reduced by the incorporation therein of a so-called flexibilizer such as the diglycidyl ester of linoleic acid dimer, or of a small amount of CTBN rubber (carboxy-terminated butadiene-acrylonitrile rubber). Such approaches reduce the final brittleness, but may also reduce the overall strength of the resin and even lower the $T_g$. Two years ago, a new family of toughened epoxy resin systems was introduced by this inventor. These systems were based on diglycidyl bis(hydroxyphenyl)propane and tetrahydrophthalic anhydride, modified by addition of a 1,2-polybutadiene-maleic anhydride adduct as a toughening additive. These systems, marketed under the trade name "Tufpoxy", exhibited improved toughness, as measured by the unnotched Izod test, without lowering the $T_g$ or seriously compromising other resin properties. However the glass transition temperatures of these toughened resins were far too low for aerospace composite applications—around 130° C. as compared with $T_g$s in the 250–350° C. range for the bismaleimides and polyimides.

SUMMARY OF THE INVENTION

I have now discovered that toughened epoxy resin systems can be prepared with dramatically improved glass transition temperatures—from about 250° C. to 350° C.—similar to those of bismaleimides and polyimides, while retaining the ease of processing characteristic of epoxy resin systems. The new systems of my invention are prepared from a mixture of the following components:

(1) An epoxy resin or mixture of epoxy resins so chosen that all of the epoxy resins present therein have a functionality of at least two epoxy groups per molecule, and that the average functionality of the total mixture is greater than two epoxy groups per molecule;

(2) An anhydride hardener system consisting essentially of
 (a) A bicycloalkene carboxylic acid anhydride; and
 (b) A 1,2-polybutadiene-maleic anhydride adduct having from about 15 to about 25% combined maleic anhydride and having an equivalent weight in the range of from about 400 to about 700;
the stoichiometric ratio of (a) to (b) being between about 75 to 1 and 2 to 1 and the stoichiometric ratio of hardener mixture (2) to epoxy resin mixture (1) being from about 0.7 to 1 equivalents of total anhydride per one equivalent of epoxy resin;

(3) An epoxy/anhydride accelerator selected from dialkylimidazolethiones, dialkylimidazoles, tertiary amines, Lewis bases, dicyandiamide, and mixtures thereof, or alternately Lewis acids, the accelerator content being from about 0.1 to 5.0% by weight of the total epoxy resin (1);

(4) Optionally, supplemental hardeners selected from
 (a) A 1,2-polybutadiene resin in an amount equal to from zero to 150% of the weight of polybutadiene-maleic anhydride adduct;
 (b) Benzophenone tetracarboxylic acid dianhydride in an amount from zero to 100% by weight of the bicycloalkene carboxylic acid anhydride;
 (c) The bismaleimide of an aromatic diamine in an amount of from zero to about 25% of the total mixture. This mixture is subjected to a preliminary cure at from 80 to 120° C. until it has gelled. The gel is then subjected to further curing at from 200° C. to 300° C. until the cure is complete to obtain the final toughened high-temperature solid resin.

My invention will now be described in greater detail.

DETAILED DESCRIPTION OF THE INVENTION

The dramatic and unobvious improvement in glass transition temperatures of the resins of this invention over the "Tufpoxy" systems and other epoxy resin systems previously known in the art is undoubtedly due to a combination of factors, which are not completely understood. The selection of components is critical to the achievement of the desired high $T_g$, but there are a wide variety of choices available to the skilled worker with which to carry out my invention. In regard to the epoxy resin component, a single epoxy resin could conceivably be used, provided that it has an epoxy functionality greater than two epoxy groups per molecule. It is preferred that the epoxy resin be aromatic or cycloaliphatic—for example, triglycidyl p-aminophenol (aromatic) or the bis(epoxide) of cyclohexenylmethyl cyclohexene carboxylate(cycloaliphatic). The aromatic and cycloaliphatic epoxy resins generally produce cured resins with better strength characteristics. It is common in the art to use a mixture of epoxy resins, and this is acceptable in the resin systems of my invention, provided that no epoxy resin component has less that two epoxy groups per molecule and that the average functionality of the mixture is greater than two. A mixture of triglycidyl p-aminophenol (functionality 3) with diglycidyl bis(hydroxyphenyl)propane (functionality 2) or alternately, the bis(epoxide) of cyclohexenylmethyl cyclohexenecarboxylate (functionality also 2) will have an average functionality greater than 2 and will be useful in the epoxy resin systems of my invention. Whereas an average functionality as low as 2.1 will exhibit improved high temperature properties, it is preferred that the average functionality be at least 2.5. Glycidyl ethers of phenol- and cresol-formaldehyde condensates (novolacs) are known with 6 to 7 epoxy groups per molecule, but these are somewhat difficult to work with, being solids or highly viscous liquids; and it is preferred that the functionality of the epoxy resin(s) of my invention be no higher than 4 (as in the case of tetraglycidyl methylene dianiline).

The choice of anhydride hardener is critical to achieving the high $T_g$s of my invention. The primary anhydride hardener of my invention is a bicycloheptene dicarboxylic acid anhydride

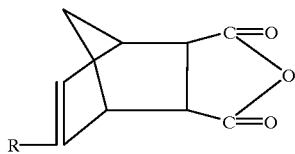

wherein R is either hydrogen ("nadic anhydride") or methyl (CH$_3$)("nadic methyl anhydride.") These anhydrides are prepared by the condensation of maleic anhydride with cyclopentadiene or methyl cyclopentadiene respectively. Used in combination with the bicycloheptene carboxylic anhydride hardener is a maleic anhydride adduct of 1,2-polybutadiene. 1,2-Polybutadiene resins having a molecular weight of 1000 to 4000 have the ability to react with maleic anhydride to form adducts (sometimes called maleinized polybutadienes) which still retain the anhydride moiety intact, and thus can function as a co-hardener along with the bicycloheptene anhydride. As small an amount as one equivalent of maleinized polybutadiene with 75 equivalents bicycloheptene dicarboxylic anhydride can exert an improvement, although it is more usual to use a stoichiometry of 1 to 15, or even as high as 1 to 2. There are several different grades of maleinized polybutadiene available on the market, differing in maleic anhydride content. For the resin systems of my invention, a maleinized polybutadiene having a maleic anhydride content of from about 15 to about 25% and having an equivalent weight in the range of from about 400 to 700 is required. Polybutadienes having lower maleic anhydride contents do not give the desired improvement—polybutadienes having higher maleic anhydride contents tend to give compatibility problems. The maleinized polybutadiene, in addition to its use as hardener, functions as a toughening agent in the final cured resin.

The epoxy/anhydride accelerator for my invention is selected from catalysts well known in the art, and is used at a level of from about 0.1 to 5% of the total weight of the system. A preferred accelerator is methyl propyl imidazole-2-thione. In order to obtain the high $T_g$s of my invention, it is extremely important to carry out a preliminary cure at from about 80° C. to 120° C. until the initial liquid mixture has completely gelled. This may require from 15 minutes to an hour, depending on the components in the system and on the accelerator used. Once the mixture has gelled, it can be subjected to further cure at from about 200° C. to 300° C. until the reaction is complete. The progress of the cure can be monitored by differential scanning calorimetry (DSC), thermal mechanical analysis (TMA), or other laboratory techniques, as noted hereinabove. The final solid cured resin will have a glass transition temperature in the 250–350° C. range. Depending on the starting materials, the final resin may be clear, hazy, or opaque. All in all, the epoxy resin systems of my invention may be handled in the same way and used in the same applications as the epoxies of the prior art—e.g. in the manufacture of composites, adhesives, filament winding, and the like.

Whereas the systems of my inventions have outstanding high temperature capabilities and toughness, they may be improved still further by incorporating into the original mixture one or more of the following supplemental hardeners:

1) A 1,2-polybutadiene resin having a molecular weight of from 1000 to 4000, added in an amount of from zero to 150% of the maleinized polybutadiene used in the mixture.

It was interesting and totally unexpected that, whereas the use of a maleinized polybutadiene having less than 15% maleic anhydride did not improve the systems of my invention, the combination of a polybutadiene having 15–25% maleic anhydride with a polybutadiene having no maleic anhydride at all showed a definite improvement.

2) Benzophenone tetracarboxylic acid dianhydride in an amount from zero to 100% of the weight of bicycloheptene dicarboxylic anhydride present. This aromatic acid dianhydride raises the glass transition temperature of the final cured resin, often to a significant extent. It also lowers the temperature at which the preliminary cure needs to be carried out (from around 115° C. for most systems of my invention down to about 80–90° C.)

3) Bis(maleimides) of aromatic diamines such as methylene dianiline, in an amount of from zero to about 25% of the total mixture.

Whereas one can rationalize the 1,2-polybutadiene resin as undergoing vinyl polymerization with the maleinized polybutadiene, and likewise rationalize the benzophenone tetracarboxylic acid dianhydride as another anhydride hardener, it is not immediately apparent how the bis (maleimide) improves the systems of my invention—but nonetheless, it appears to work.

My invention will now be illustrated by the following Examples:

Example 1

An epoxy resin mixture consisting of 57 grams triglycidyl p-aminophenol (0.52 equivalents) and 41 grams epoxidized cyclohexenylmethyl cyclohexenecarboxylate (0.299 equivalents) was prepared. Its average functionality as 2.7 epoxy groups per molecule. An anhydride hardener mixture was prepared from 126 grams of nadic methyl anhydride (0.7 equivalents) and 23 grams of a maleinized polybutadiene (0.046 equivalents) having a molecular weight of 1625 and a maleic anhydride content of 20%, with an anhydride functionality of 3.3. The epoxy and hardener components were intimately mixed with 2 grams of methyl propyl imidazole-2-thione accelerator, and heated to 115° C. till the liquid mixture had completely gelled (15–45 minutes). It was then subjected to further cure at 200–300° C. until thermal mechanical analysis indicated that polymerization was complete. The resulting clear dark red resin had a glass transition temperature $T_g$ of 251° C. The anydride/epoxy stoichiometry was 0.9.

Example 2

To the mixture of Example 1, 10 grams (4% of the total) of 1,2-polybutadiene having a molecular weight of 1300 was added, and the resulting combination cured as in Example 1. A tan opaque resin was obtained with a $T_g$ of 249° C.

Example 3

To a mixture of 53 grams (0.48 equivalents) of trigylcidyl p-aminophenol and 40 grams (0.29 equivalents) of epoxidized cyclohexenylmethyl cyclohexenecarboxylate was added a mixture of 116 grams (0.64 equivalents) nadic methyl anhydride, 20 grams (0.04 equivalents) of maleinized polybutadiene (as in Example 1), and 8 grams (0.05 equivalents) of benzophenone tetracarboxylic dianhydride. The stoichiometry was 0.9 equivalents total anhydride to one equivalent epoxy resin. Three grams of methyl propyl imidazole-2-thione accelerator were added, and the resulting mixture subjected to a preliminary cure at 85° C. for 10 to 30 minutes till it had completely gelled. It was then further cured at 200–300° C. till reaction was complete. The resulting clear dark red resin had a glass transition temperature $T_g$ of 316° C.

Example 4

To the mixture of Example 1 was added 18 grams of the bis(maleimide) of methylene dianiline. After curing, the final resin had a $T_g$ of 321° C.

The above Examples are by way of illustration only, and are not meant to be limiting within the scope of the following Claims.

I claim:

1. A toughened epoxy resin system having glass transition temperatures $T_g$ in the range of from about 250° C. to 350° C., said resin system being prepared from a blend comprising the following components:
   (1) An epoxy resin component selected from the group consisting of
      a) a single epoxy resin having an epoxy functionality greater than two epoxy groups per molecule; and
      b) a mixture of epoxy resins so selected that all of the epoxy resins in said mixture have an epoxy functionality of at least two epoxy groups per molecule and that said mixture has an average epoxy functionality greater than 2 epoxy groups per molecule;
   (2) An anhydride hardener component consisting essentially of a mixture of
      (a) A bicycloalkene dicarboxylic acid anhydride; and
      (b) A 1,2-polybutadiene-maleic anhydride adduct containing from about 15 to 25% combined maleic anhydride and having an equivalent weight in the range of about 400 to 700;
   the stoichiometric ratio of (2)(a) to (2)(b) being from 75 to 1 equivalents to 2 to 1 equivalents, and the stoichiometric ratio of said anhydride hardener component (2) to said epoxy resin component (1) being from about 0.7 equivalents of said anhydride hardener component to 1 equivalent of said epoxy resin component;
   (3) An epoxy accelerator selected from the group consisting of dialkyl imidazolethiones, dialkylimidazoles, tertiary amines, Lewis bases, dicyandiamide, and mixtures thereof, and alternately Lewis acids, the total content of accelerator being from about 0.1 to 5% by weight of total epoxy resin system;
   said blend being subjected to a preliminary cure at from about 80° C. to 120° C. till said blend has gelled, and then to further curing at temperatures of from 200 to 300° C. till curing is complete, thereby obtaining final toughened solid resin.

2. The toughened epoxy resin system of claim 1 wherein the anhydride hardener (2)(a) is nadic methyl anhydride or nadic anhydride.

3. The toughened epoxy resin system of claim 2 wherein the epoxy resin mixture consists of triglycidyl p-aminophenol and epoxidized cyclohexenylmethyl cyclohexenecarboxylate, with an average functionality of 2.5 or above.

4. The toughened epoxy resin system of claim 3 wherein the accelerator is methyl propyl imidazole-2-thione.

5. An epoxy resin system according to claim 1 wherein the epoxy resin component consists of a mixture of 0.52 equivalents of triglycidyl p-aminophenol and 0.299 equivalents of epoxidized cyclohexenylmethyl cyclohexenecarboxylate, and the anhydride hardener mixture consists of 0.7 equivalents of nadic methyl anhydride and 0.046 equivalents of polybutadiene-maleic anhydride adduct having a molecular weight of 1625 and a maleic anhydride content of 20%, and wherein the epoxy accelerator is methyl propyl imidazole-2-thione at 2% by weight of total epoxy resin component; said liquid blend being heated to 115° C. till gellation has occurred, and then subjected to further cure at 200–300° C. till polymerization is complete, thereby obtaining a clear solid resin having a glass transition temperature $T_g$ of 251° C.

* * * * *